United States Patent
Schultz et al.

(10) Patent No.: US 7,044,042 B2
(45) Date of Patent: May 16, 2006

(54) BLADE CUTTING ASSEMBLY FOR SHEET MATERIAL

(75) Inventors: Richard J. Schultz, Barrington, IL (US); Keith Alsberg, Chicago, IL (US); Eric Wilmot, Chicago, IL (US)

(73) Assignee: CARL Manufacturing USA, Inc., Mount Prospect, IL (US)

( * ) Notice: Subject to any disclaimer, the term of this patent is extended or adjusted under 35 U.S.C. 154(b) by 0 days.

(21) Appl. No.: 10/717,759

(22) Filed: Nov. 20, 2003

(65) Prior Publication Data

US 2005/0109180 A1    May 26, 2005

(51) Int. Cl.
*B26D 1/18* (2006.01)

(52) U.S. Cl. ............................ 83/522; 83/614; 83/955

(58) Field of Classification Search .................. 83/455, 83/614, 955, 552
See application file for complete search history.

(56) References Cited

U.S. PATENT DOCUMENTS

| | | | |
|---|---|---|---|
| 1,544,393 A * | 6/1925 | Hatcher et al. ................ | 29/251 |
| 5,069,097 A | 12/1991 | Mori | |
| 5,287,783 A | 2/1994 | Mori | |
| 5,611,255 A * | 3/1997 | Evans ........................... | 83/614 |
| 5,671,647 A | 9/1997 | Mori | |
| 5,802,942 A | 9/1998 | Cornell et al. | |
| D415,519 S | 10/1999 | Mori | |
| 6,035,755 A | 3/2000 | Mori | |
| 6,079,307 A | 6/2000 | Mori | |
| 6,951,159 B1 * | 10/2005 | Lin et al. ....................... | 83/620 |
| 2003/0140757 A1 * | 7/2003 | Carlson et al. ................ | 83/485 |
| 2005/0172774 A1 * | 8/2005 | Tseng ........................... | 83/614 |
| 2005/0223863 A1 * | 10/2005 | Volfson et al. ................ | 83/485 |

OTHER PUBLICATIONS

"Accucut A200 Dial-A-Blade" (copy of packaging) Jun. 2003.

* cited by examiner

*Primary Examiner*—Kenneth E. Peterson
(74) *Attorney, Agent, or Firm*—Wood, Phillips, Katz, Clark & Mortimer (57) ABSTRACT

The combination of a base, with which at least one sheet layer can be operatively supported to be cut, a guide assembly, and a cutting blade assembly. The cutting blade assembly includes first and second cutting blades. The cutting blade assembly is selectively changeable between a) a first state wherein the first cutting blade is in a first operative position and the second cutting blade is in a first inactive position, and b) a second state wherein the second cutting blade is in a second operative position and the first cutting blade is in a second inactive position. The cutting blade assembly cooperates with the guide assembly to be movable guidingly in a cutting path.

12 Claims, 9 Drawing Sheets

BLADE CUTTING ASSEMBLY FOR SHEET MATERIAL

BACKGROUND OF THE INVENTION

1. Field of the Invention

This invention relates to sheet cutters and, more particularly, to a blade cutting assembly having a plurality of cutting blades which can be selectively placed in an operative position.

2. Background Art

Myriad designs currently exist for sheet cutters. In one common construction, a base is provided to support a stacked, plurality of sheet layers in an operative cutting position. A guide assembly, including an elongate guide rail, is mounted on the base. A blade cutting assembly is guided by the rail in a predetermined cutting path.

The cutting blade assembly supports a cutting blade in such a manner that the cutting blade penetrates the sheet layer(s) as the cutting blade assembly moves in the cutting path. The cutting blades generally have either a fixed configuration or a rotary configuration. In the former case, the cutting blade is typically cantilevered from a support. In the latter case, the cutting blade is typically disc-shaped and mounted for rotation about an axis. The disc-shaped blade may have different cutting edge configurations which allow either continuous straight or non-straight cut formation or perforate cut formation.

Regardless of their configuration, cutting blades are prone to being dulled after extensive use. Most cutters are designed to allow replacement of a cutting blade when this condition occurs or the cutting blade is damaged. Typically, the cutting blade assembly is designed to have a portion thereon that can be separated to allow access to, and replacement of, the active cutting blade. This requires that the user halt cutting operations, disassemble part of the cutting blade assembly, remove the active cutting blade, install a new cutting blade, and reassemble the portion of the cutting blade assembly. Aside from the lost time associated with this operation, the user is inconvenienced and required to handle cutting blades with sharp edges that could potentially inflict injury.

It is also common to interchange cutting blades with different cutting characteristics. For example, on a single sheet layer, it may be desirable to sever an edge of the sheet layer to produce a particular size, and to thereafter form perforations on the same sheet layer. To operate on a sheet layer in this manner, the user is required to start with one cutting blade configuration, remove that blade and replace the same with a second configuration of blade after the first cutting operation is performed, and thereafter reinstall the blade with the first configuration. Depending upon the particular construction of the cutting blade assembly, this process may be quite time consuming and burdensome.

Ideally, cutting blades with the same or different configurations would be interchangeable readily and with a minimal time investment on a user's part. The industry continues to seek out sheet cutter designs with enhanced versatility and which facilitate operation by a user without creating an obtrusive structure, or one that becomes impractically expensive for the particular category of user at which it is targeted.

SUMMARY OF THE INVENTION

In one form, the invention is directed to the combination of a base, with which at least one sheet layer can be operatively supported to be cut, a guide assembly, and a cutting blade assembly. The cutting blade assembly includes first and second cutting blades. The cutting blade assembly is selectively changeable between a) a first state wherein the first cutting blade is in a first operative position and the second cutting blade is in a first inactive position, and b) a second state wherein the second cutting blade is in a second operative position and the first cutting blade is in a second inactive position. The cutting blade assembly cooperates with the guide assembly to be movable guidingly in a cutting path. The first cutting blade in the first operative position causes cutting of a sheet layer operatively supported on the base as the cutting blade assembly is moved in the cutting path. The second cutting blade in the second operative position causes cutting of a sheet layer operatively supported on the base as the cutting blade assembly is moved in the cutting path.

In one form, the first cutting blade moves from the first operative position into the second inactive position as an incident of the second cutting blade moving from the first inactive position into the second operative position.

In one form, the first and second cutting blades are mounted on a blade carrier that is movable guidingly to simultaneously change the first and second cutting blades between their operative and inactive positions.

In one form, the blade carrier is guidingly movable around an axis to change the first and second cutting blades between their operative and inactive positions.

In one form, the base has a flat support surface on which the at least one sheet layer can be operatively supported. The flat support surface resides in a first plane. The axis is substantially parallel to the first plane.

The first and second cutting blades may have the same or a different configuration to make the same or different types of cuts in a sheet layer.

In one form, there is an automatically releasable mechanism that maintains the blade carrier in a first position wherein the first cutting blade is in the first operative position.

In one form, the cutting blade assembly consists of a frame, with there being structure cooperating between the frame and blade carrier for releasably maintaining the blade carrier in a first position relative to the frame wherein the first cutting blade is in the first operative position.

The structure cooperating between the frame and blade carrier may be capable of releasably maintaining the blade carrier in a second position relative to the frame wherein the second cutting blade is in the second operative position.

The guide assembly may include an elongate rail.

The elongate rail may be repositionable relative to the base, as by translational movement relative to the base, or by guided pivoting movement relative to the base.

The cutting blade assembly may include a third cutting blade.

In one form, the blade carrier has a body with first and second oppositely facing flat sides and first and second posts projecting from the first flat side and journalled for rotation respectively in the first and second cutting blades.

In one form, the first post projects in a first line, the second post projects in a second line, and the first and second lines are substantially parallel to the axis.

In one form, the cutting blade assembly has indicia to identify which of the first and second cutting blades is in its operative position.

A graspable knob may be connected to the blade carrier and is repositionable to move the blade carrier around the axis.

In one form, the cutting blade assembly has a frame consisting of first and second joinable housing portions and the blade carrier is captive between the first and second housing portions.

In one form, the guide assembly has an elongate rail and the first housing part has a slot through which at least a part of the rail extends. At least part of the rail slides guidingly within the slot as the cutting blade assembly is moved in the cutting path.

The invention is further directed to a cutting blade assembly for cutting sheet material. The cutting blade assembly has a frame, a blade carrier, first and second cutting blades on the carrier, and a guide rail engaging assembly capable of cooperating with a guide rail to guide the cutting blade assembly in a predetermined cutting path. The blade carrier is movable guidingly relative to the frame to be selectively placed in a) a first position relative to the frame wherein the first cutting blade is in an operative position and the second blade is in an inactive position and b) a second position relative to the frame wherein the second cutting blade is in an operative position and the first cutting blade is in an inactive position.

The blade carrier may be movable around an axis between the first and second positions.

In one form, with the guide rail engaging assembly cooperating with the guide rail, the cutting blade assembly is movable in the predetermined cutting path parallel to a plane of a flat surface upon which a sheet layer to be cut can be supported. The axis is substantially parallel to the plane of the flat surface.

DETAILED DESCRIPTION OF THE DRAWINGS

Figure 1:
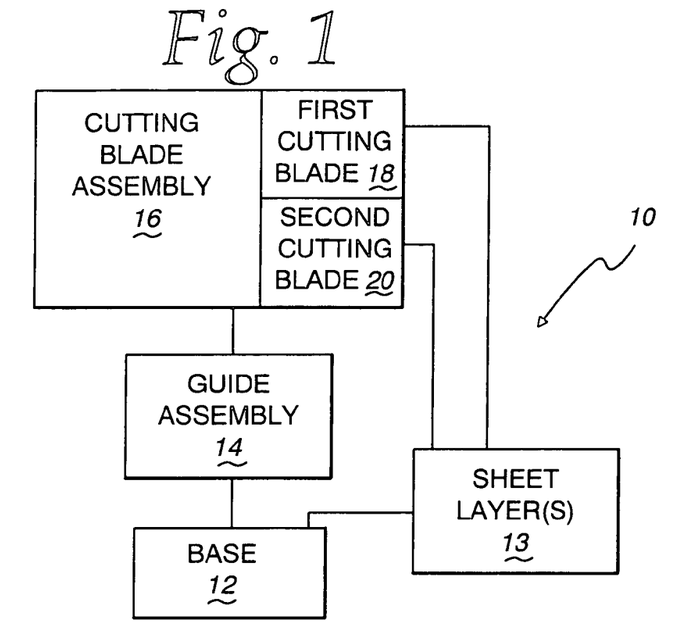
FIG. 1 is a schematic representation of a sheet layer cutting system, according to the present invention, and including a cutting blade assembly with first and second blades, which cutting blade assembly cooperates with a guide assembly on or adjacent to a base to cut at least one sheet layer operatively situated on the base.

In FIG. 1, a sheet layer cutting system, according to the present invention, is shown in a generic, schematic form at 10. The sheet layer cutting system 10 consists of a base 12 on which at least one sheet layer 13 is operatively supported to be cut. A guide assembly 14 is mounted upon, or in proximity to, the base 12. A cutting blade assembly 16 cooperates with the guide assembly 14 to be movable guidingly in a cutting path. The cutting blade assembly 16 has a first cutting blade 18 and a second cutting blade 20. The cutting blade assembly 16 is selectively changeable between a) a first state wherein the first cutting blade 18 is in a first operative position and the second cutting blade 20 is in a first inactive position and b) a second state wherein the second cutting blade 20 is in a second operative position and the first cutting blade 18 is in a second inactive position. The first cutting blade 18 in the first operative position causes cutting of the sheet layer(s) 13 operatively supported on the base 12 as the cutting blade assembly 16 is moved in the cutting path. The second cutting blade 20 in the second operative position causes cutting of the sheet layer(s) 13 operatively supported on the base 12 as the cutting blade assembly 16 is moved in the cutting path.

The present invention is focused principally upon the construction of the cutting blade assembly 16. The cutting blade assembly 16 is shown with the other components of the sheet layer cutting system 10 in generic form in FIG. 1 to emphasize that the cutting blade assembly 16, described hereinafter, is intended to, and can, be used in virtually any sheet layer cutting environment. A number of exemplary environments will be described hereinbelow, with it being understood that the inventive cutting blade assembly 16 is operable in virtually any environment wherein a cutting blade assembly is movable guidingly in a cutting path relative to one or more sheet layers 13 operatively supported on a base.

Figure 2:
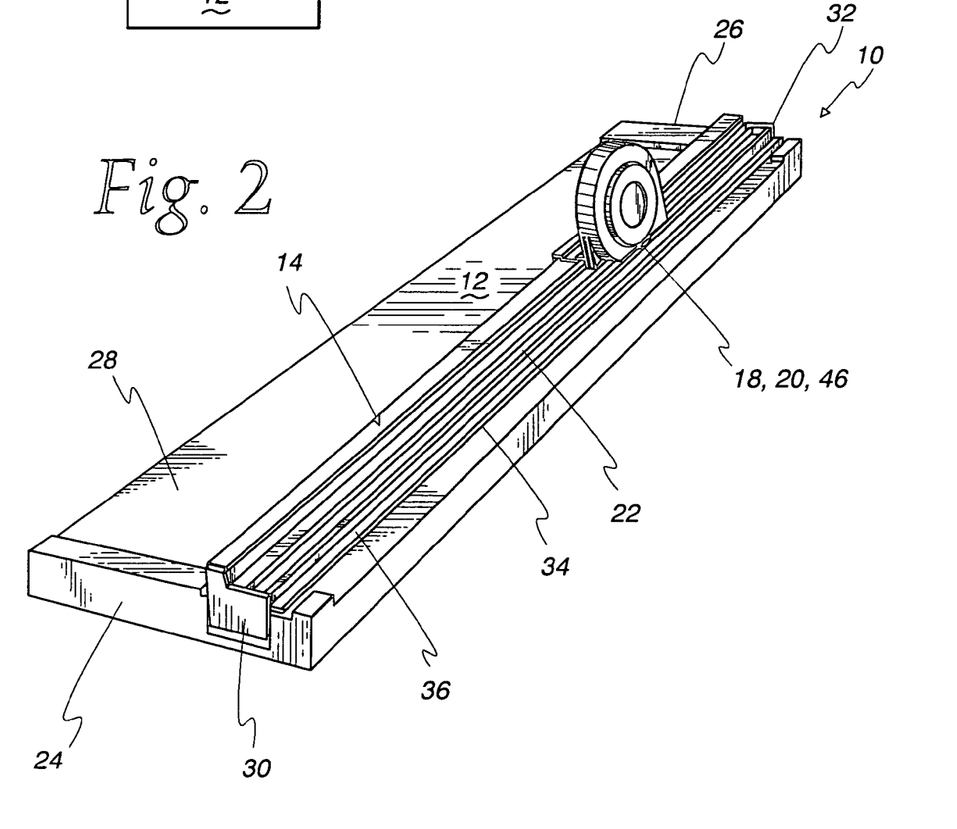
FIG. 2 is a perspective view of one form of sheet layer cutting system, of the type shown schematically in FIG. 1, with multiple rotary cutting blades on a blade carrier.
Figure 3:
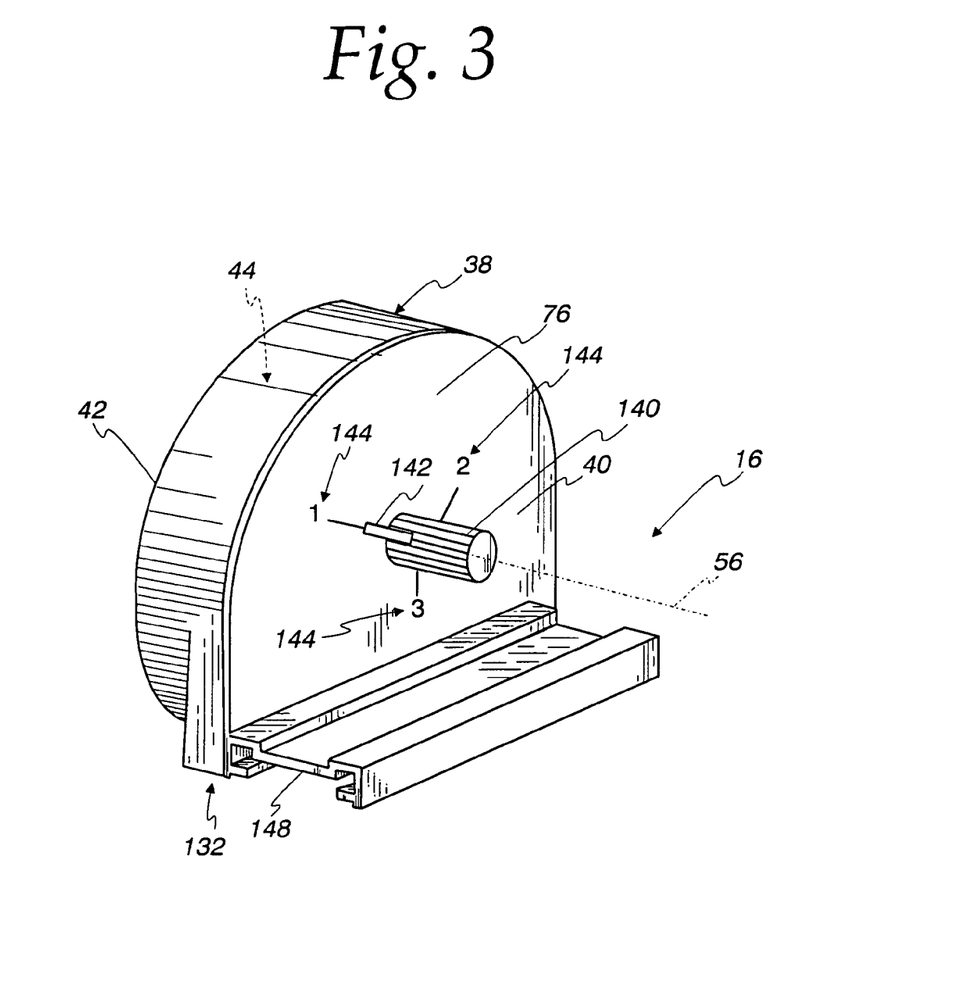
FIG. 3 is a perspective view of the cutting blade assembly on the inventive sheet layer cutting system in FIGS. 1 and 2.

Referring now to FIG. 2, one form of the sheet layer cutting system 10 is shown in greater detail. The cutting blade assembly 16 is shown as part of a sheet layer cutting system similar to that disclosed in U.S. Pat. No. 5,671,647, which is incorporated herein by reference. Briefly, in the sheet layer cutting system 10, the guide assembly 14 has an elongate rail 22 which extends substantially fully between spaced ends 24, 26 of the base 12. The base 12 has a flat, sheet layer support surface 28 upon which a single sheet layer 13, or stacked multiple sheet layers 13, can be operatively supported so as to reside beneath the rail 22. In this particular sheet layer cutting system 10, the opposite ends 30, 32 of the rail 22 are spring biased upwardly so that the rail 22 is normally biasably suspended in an elevated position relative to the base 12. By pressing downwardly upon the cutting blade assembly 16, the spacing between the bottom 34 of the rail 22 and the support surface 28 can be diminished to captively hold the sheet layer(s) 13 to be cut. The rail 22 can be made rigid or flexible, as disclosed in U.S. Pat. No. 5,671,647. In the former case, the rail 22 can be translated downwardly without significant, or any, deformation, whereas in the latter case, the rail 22 is locally depressed between its ends 30, 32 so that the rail 22 flexes to an upwardly opening U shape. The base 12 has a blade backing surface 36 against which the operative cutting blade 18, 20 can be compressibly borne without inflicting significant damage thereto, or causing significant dulling thereof, as the cutting blade assembly 16 is moved during a cutting operation.

Referring now to FIGS. 3–7, the details of the cutting blade assembly 16 are shown. The cutting blade assembly 16 has a frame 38 formed as a two part housing. The frame/housing consists of a first housing part 40 and a second housing part 42. The second housing part 42 is cup-shaped to define a component receptacle 44.

In this embodiment, the cutting blade assembly 16 includes the first and second cutting blades 18, 20, and a third cutting blade 46. The cutting blades 18, 20, 46 are supported by a disc-shaped carrier 48. The blade carrier 48 has a body 49 with flat, oppositely facing, parallel sides/surfaces 50, 52. A stepped diameter spindle 54 projects oppositely from both carrier surfaces 50, 52 and defines a central, rotary axis 56 for the blade carrier 48.

The spindle portion 58 projecting from the carrier surface 50 nests in a complementarily formed seat 60 in a boss 62 on the second housing part 42. The spindle portion 58 is thereby guided in pivoting movement relative to the second housing part 42 within the seat 60 around the axis 56. The spindle portion 64 projecting from the carrier surface 52 oppositely to the spindle portion 58, extends through an opening 66 in the first housing part 40.

The spindle portion 64 has a stepped diameter, with a larger diameter portion 68 and a smaller diameter portion 70. At the transition between the larger diameter portion 68 and the smaller diameter portion 70, an annular, axially facing shoulder 72 is defined. With the housing parts 40, 42 joined, the spindle portion 58 resides in the seat 60 on the housing part 42 and the spindle portion 64 projects through the housing opening 66 so that the annular shoulder 72 is in close proximity to a surface 74 on a wall 76 of the first housing part 40. The blade carrier 48 is confined against axial movement, in one direction by cooperation between the carrier surface 50 and the boss 62, and in the opposite direction by cooperation between the shoulder 72 and the wall surface 74. The smaller diameter portion 70 of the spindle 54 projects through the first housing part 40 to be exposed outside thereof.

In this embodiment, additional structure is provided to positively guide pivoting movement of the blade carrier 48 and effect stabilization thereof. More particularly, the first housing part 40 has first and second, concentric annular projections 78, 80 with co-planar, free edges 82, 84 respectively. The projections 78, 80 are concentric with the axis 56 and define an annular space 86 therebetween. The carrier 48 has at least one post, and in this case three posts 88, 90, 92, projecting from the carrier surface 52. The posts 88, 90, 92 are equidistantly spaced from the axis 56 and are equidistantly spaced from each other in a circumferential direction around the carrier surface 52. The posts 88, 90, 92 have a diameter D (shown for post 90 in FIG. 5) that is slightly less than the radial dimension R (FIG. 6) for the annular space 86. With this arrangement, as the blade carrier 48 is guided in pivoting movement around the axis 56, the posts 88, 90, 92 move guidingly between the projections 78, 80 within the space 86. The blade carrier 48 is thus reinforced against tilting out of line by the cooperation between the posts 88, 90, 92 and the projections 78, 80.

Figure 5:
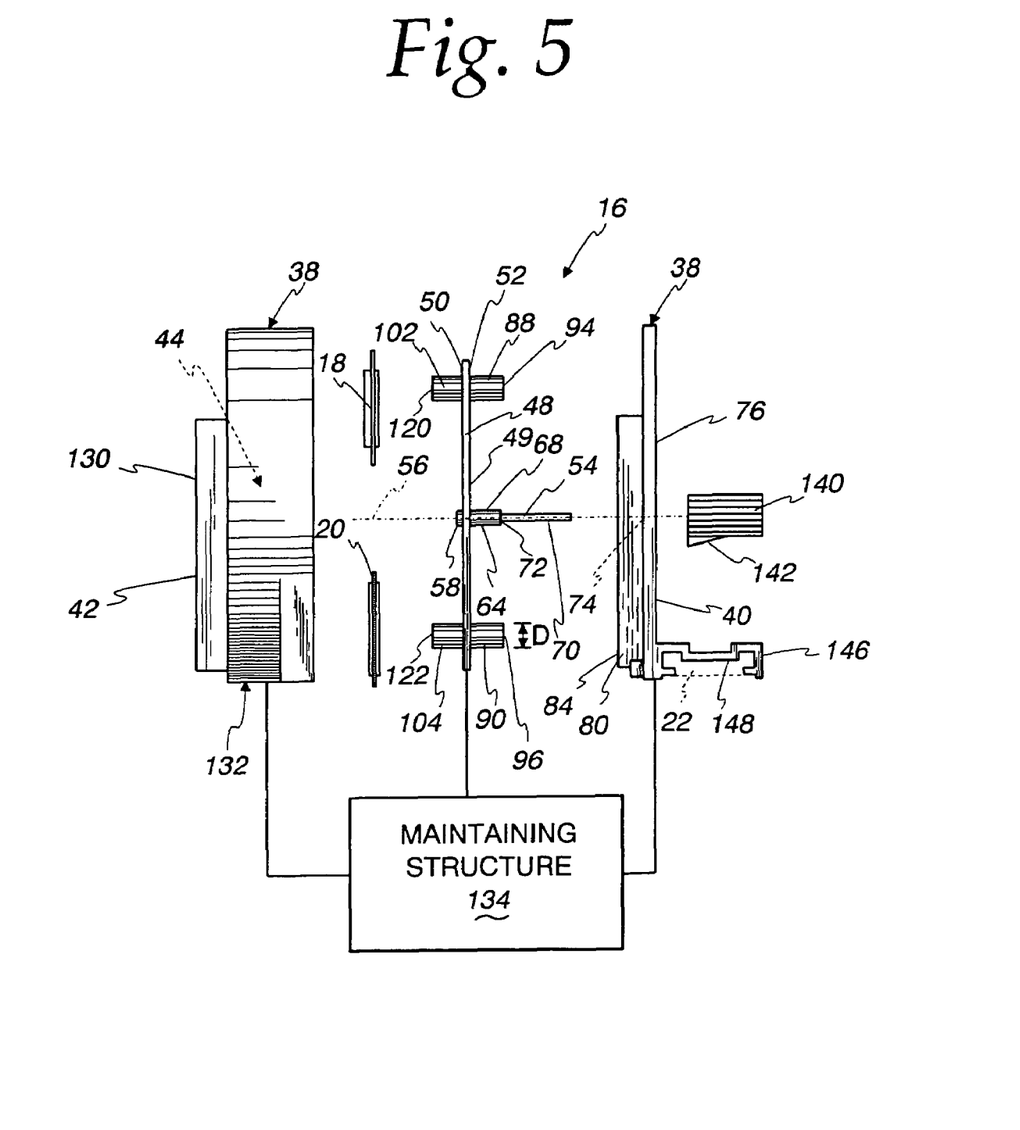
FIG. 5 is an exploded, end elevation view of the cutting blade assembly in FIGS. 3 and 4.
Figure 6:
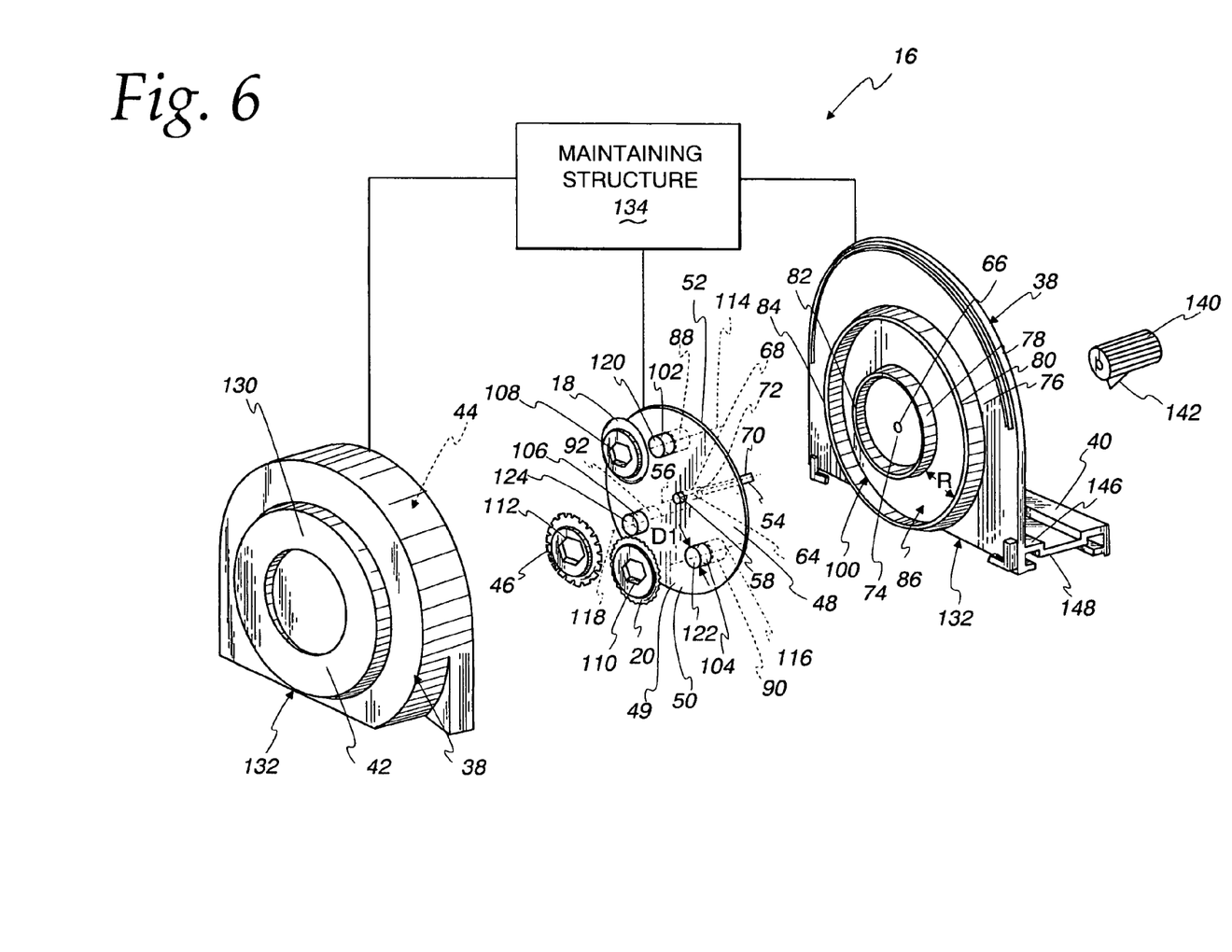
FIG. 6 is a view as in FIG. 4 and taken from the side opposite that in FIG. 4.

Additional stability may be afforded by making the carrier surface 52 abuttable to the free edges 82, 84 of the projections 78, 80 and/or by making the free edges 94, 96, 98 of the posts 88, 90, 92 abuttable to the surface 74 of the wall 76 in the region at 100 between the projections 78, 80.

Figure 4:
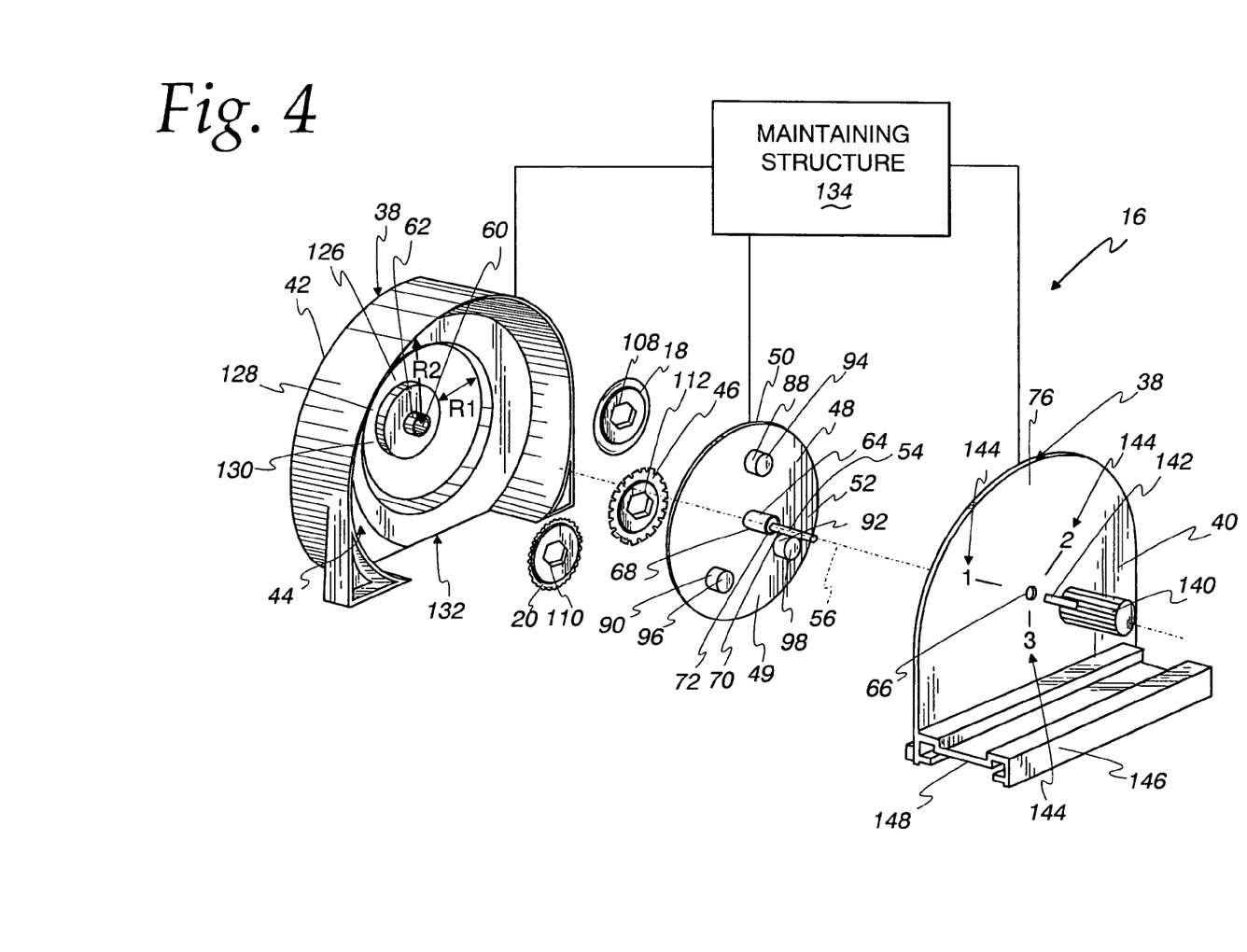
FIG. 4 is an exploded perspective view of the cutting blade assembly in FIG. 3 taken from the same side as in FIG. 3.

The cutting blades 18, 20, 46 are mounted to the blade carrier 48 through posts 102, 104, 106, respectively. The posts 102, 104, 106 project from the carrier surface 50 at locations spaced equidistantly from the axis 56. The posts 102, 104, 106 are preferably equidistantly spaced from each other in a circumferential direction. The posts 102, 104, 106 are journalled for rotation in polygonally shaped openings 108, 110, 112, respectively in the cutting blades 18, 20, and 46, to guide rotating movement thereof around axes 114, 116, 118, respectively. The axes 114, 116, 118 are preferably substantially parallel to each other and the central axis 56.

The posts 102, 104, 106 are preferably of equal length. The free edges 120 122, 124, respectively thereon, are substantially co-planar. The posts 102, 104, 106 have a length sufficient to project into an annular, undercut receptacle 126 in the second housing part 42. The axis of the undercut receptacle 126 is concentric with the axis 56. The radial dimension R1 of the receptacle 126 (FIG. 4) is slightly greater than the diameter D1 of each of the posts 102, 104, 106. Accordingly, the posts 102, 104, 106 guide pivoting movement of the blade carrier 48 relative to the second housing part 42 within the receptacle 126.

In the embodiment shown, the posts 88, 90, 92 are equal in diameter to the posts 102, 104, 106. This is not a requirement. Additionally, as shown, the central axes of the posts 88, 102; 90, 104; and 92, 106 are concentric. Again, this is not a requirement.

With the cutting blade assembly 16 assembled, the free edges 120, 122, 124 of the posts 102, 104, 106 may abut to a surface 128 on a wall 130 on the second housing part 42. This limits axial movement of the blade carrier 48 and provides additional stability to the blade carrier 48 relative to the frame/housing 38.

The component receptacle 44, defined by the frame/housing 38, is substantially round as viewed along the axis 56. The effective radius R2 (FIG. 4) of this receptacle 44 is sufficient to allow the blade carrier 48, with the cutting blades 16, 18, 46 thereon, to rotate about the axis 56 without interference between the blade carrier 48, cutting blades 18, 20, 46, and frame/housing 38. The frame/housing 38 has a truncation at 132 which effectively reduces the radius below the dimension R2 so as to allow each of the cutting blades 18, 20, 46 to be individually placed in an operative position wherein it is exposed therethrough as shown in FIG. 7, to allow that blade to make a cut in the sheet layer(s) 13.

Figure 7:
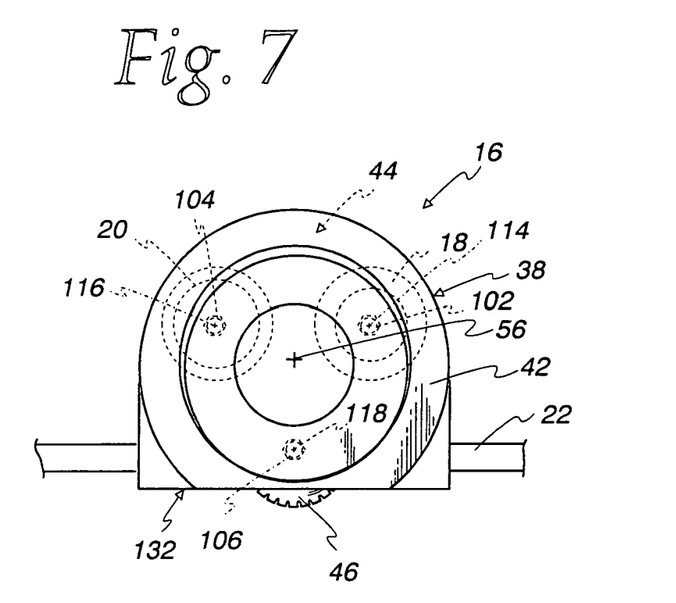
FIG. 7 is an elevation view of the cutting blade assembly taken from the same side as in FIG. 6 and shown operatively connected to a portion of a guide rail on the guide assembly in FIGS. 1 and 2.

In FIG. 7, the cutting blade assembly 16 is shown in a first state wherein the blade carrier 48 is indexed to one position wherein the third cutting blade 46 is in an operative position for cutting, while both of the first and second cutting blades 18, 20 are in inactive positions. In the inactive positions, the first and second cutting blades 18, 20 are fully covered by the frame/housing 38 so as not to be exposed to a user. The cutting blade assembly 16 can be placed in two additional, different states by pivoting the carrier around the axis 56 to two different positions. In a second state, the first cutting blade 18 is in an operative position corresponding to the position of the third cutting blade 46 in FIG. 7, with the second and third cutting blades 20, 46 thereby placed in an inactive position. In the third state for the cutting blade assembly 16, the second cutting blade 20 is in an operative position, with the first and third cutting blades 18, 46 in inactive positions.

Figure 8:
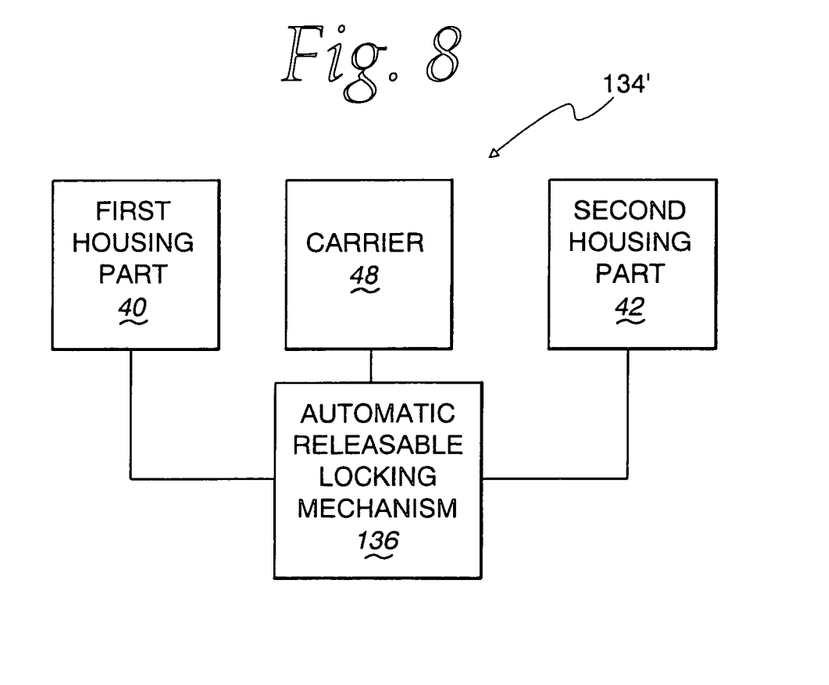
FIG. 8 is a schematic representation of a one form of structure for maintaining the inventive cutting blade assembly in different states wherein different cutting blades are selectively placed in an operative position.
Figure 9:
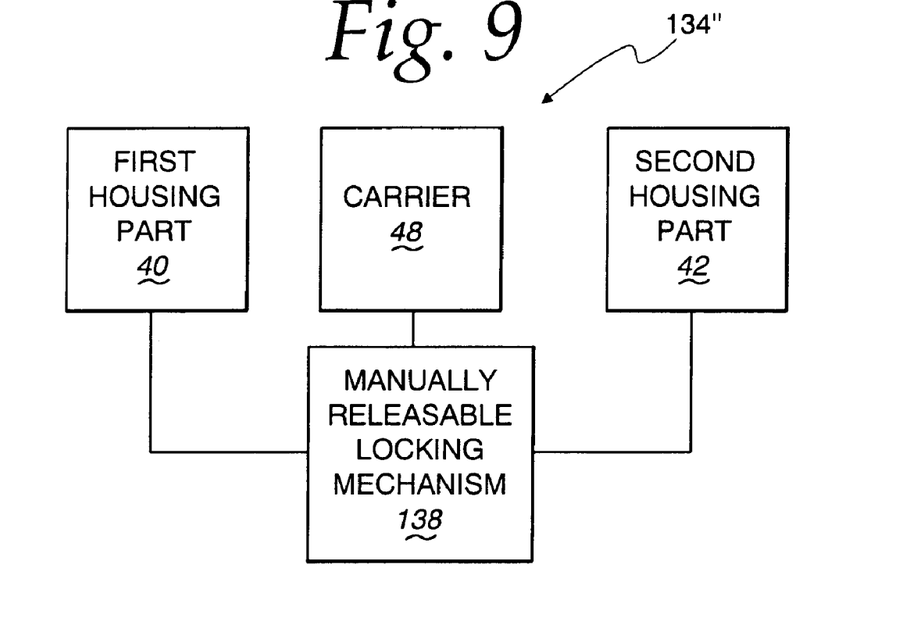
FIG. 9 is a view as in FIG. 8 of a modified form of structure.

Structure shown schematically at 134 in FIGS. 4 and 6 cooperates between the blade carrier 48, and one or both of the housing parts 40, 42, to releasably maintain the cutting blade assembly 16 in the three different states described. That is, the maintaining structure 134 releasably maintains the blade carrier 48 in three different rotational positions relative to the frame/housing 38. The structure 134 can have virtually a limitless number of different forms that are currently known or may be devised by those skilled in the art. In FIGS. 8 and 9, two different types of maintaining structures are shown schematically at 134' and 134", respectively. The maintaining structure 134' consists of an automatic releasable locking mechanism 136, which cooperatives between the blade carrier 48 and at least one of the housing parts 40, 42. The locking mechanism 136 may include a detent-type of arrangement which releasably maintains the blade carrier 48 in each of the three different positions, described above. This locking mechanism 136 may resist pivoting of the blade carrier 48 with a force sufficient to allow the cutting blade assembly 16 to be normally operated without the risk of inadvertent movement of the blade carrier 48. The locking mechanism 136 may be constructed so that this holding force can be overcome by a torque applied by the user, whereby the blade carrier 48 can be repositioned to place the cutting blade assembly 16 in either of the other two states.

In FIG. 9, a manually releasable locking mechanism 138 is shown in schematic form. This particular locking mechanism 138 may require manual repositioning of one or more elements by the operator to release the carrier for pivoting about the axis 56. The mechanism may be such as to require that the repositionable element be repositioned after a new cutting blade assembly state is set, to maintain that particular state.

As noted above, the particular configuration and arrangement of the maintaining structures 134, 134', 134" is not critical to the present invention. Any structure that can be used to releasably maintain the blade carrier 48 in each of the three positions, described above, will suffice.

To facilitate pivoting/indexing of the blade carrier 48, a graspable knob 140, as shown in each of FIGS. 3–6, can be attached to the exposed, smaller diameter portion 70 of the spindle 54. By grasping and turning the knob 140 around the axis 56, the blade carrier 48 can be indexed to the appropriate position. To facilitate identification of the position of the blade carrier 48, a mark/tab 142 is provided on the knob 140 and is alignable with three different indicia 144 on the frame/housing 38. In this embodiment, the indicia are numbers. Alternatively, icons or depictions of the particular nature of the cutting blade may be utilized to assist the user.

As seen also in FIGS. 1–7, the first housing part 40 has a guide rail engaging assembly part 146 that defines a slot 148 to receive a part of the rail 22. The rail 22 and slot 148 are complementarily configured so that the cutting blade assembly 16 can move guidingly along the rail 22 in a desired cutting path without any appreciable skewing so as to provide consistently true and accurate cuts in the sheet layer(s) 13.

Many variations from the structures described above are contemplated. As just examples, the number of cutting blades might be less than or greater than the three shown. In the embodiment shown, the first cutting blade 18 is configured to make a straight cut, with the second cutting blade 20 configured to make a scalloped cut, and the third cutting blade 46 designed to make perforations in he sheet layer(s) 13. Different cutting blade configurations might be used. Further, two or more of the cutting blades on the blade carrier 48 may have the same configuration. The blade carrier 48 can thus be indexed to replace a dulled cutting blade with a cutting blade of like configuration.

Figure 10:
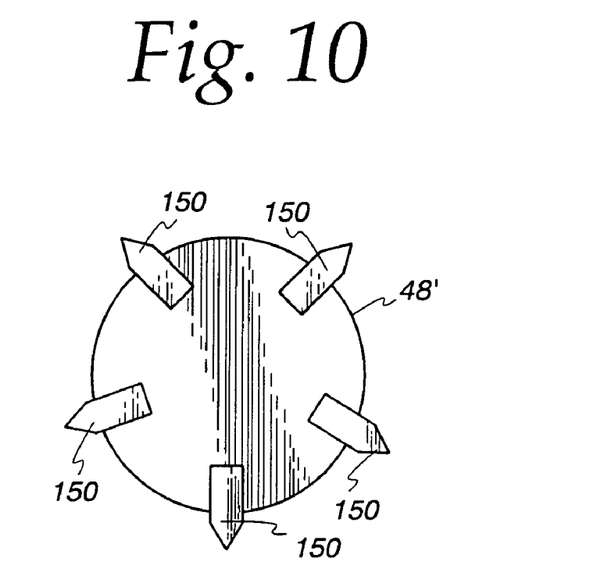
FIG. 10 is a side elevation view of a modified form of blade carrier with fixed cutting blades.

Further, it is not necessary that the cutting blades be of the rotary type. As shown in FIG. 10, a blade carrier 48', corresponding to the blade carrier 48, has five fixed cutting blade 150 mounted thereon to be selectively indexed to an operative, cutting position in the same manner as are the blades 18, 20, 46.

Figure 11:
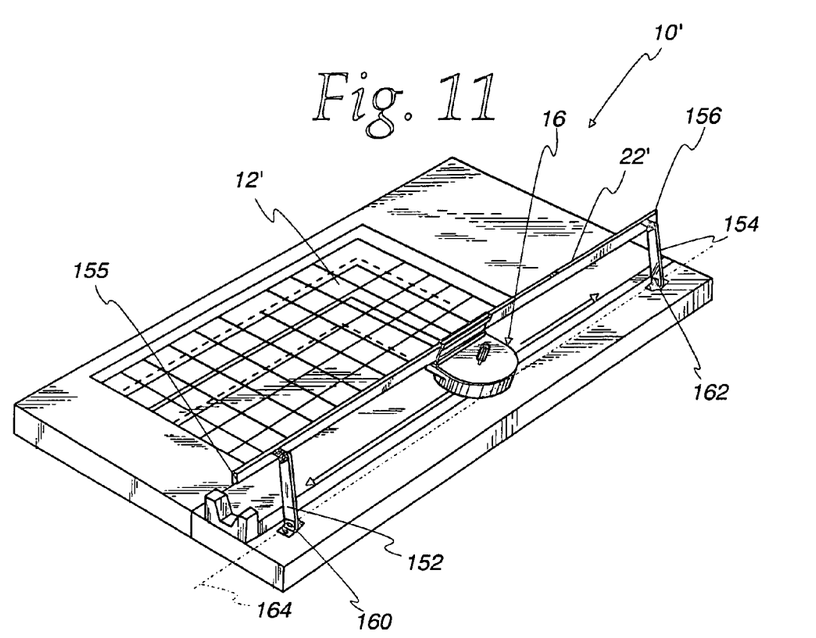
FIG. 11 is a perspective view of a modified form of sheet layer cutting system, according to the present invention, and in a loading state.
Figure 12:
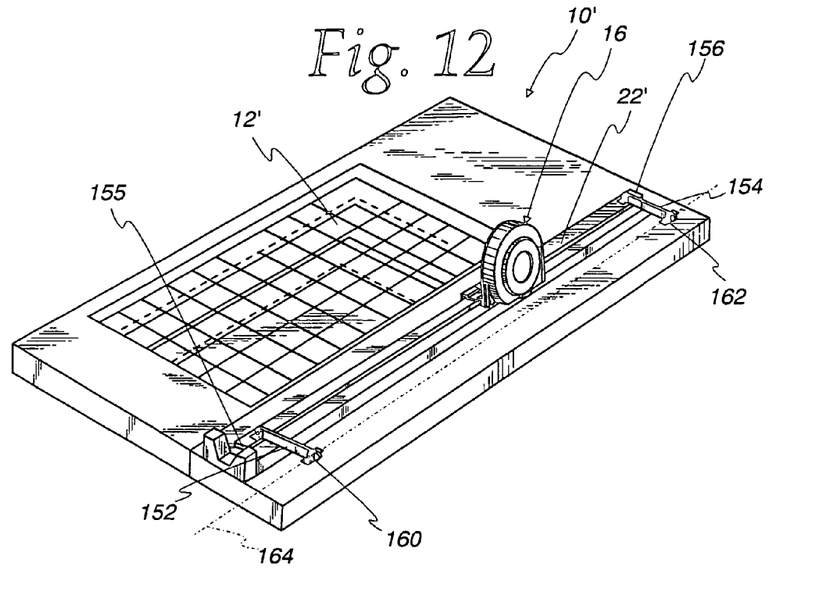
FIG. 12 is a view as in FIG. 11 with the system in an operating state.

Further, the particular arrangement for mounting the elongate rail 22 is not limited to the manner shown in FIG. 2. As shown for example in FIGS. 11 and 12, an elongate rail 22' may be mounted on a base 12' through arms 152, 154 at the ends 155, 156 of the rail 22'. The arms 152, 154 are pivotably connected to lugs 160, 162 for pivoting with the rail 22' about a common axis 164. The cutting blade assembly 16 has the configuration, previously described, and is mounted to the rail 22' for guided movement in a cutting path, as also previously described. With this arrangement, the rail 22' and cutting blade assembly 16 can be pivoted between a loading position, shown in FIG. 11, and an operative position shown in FIG. 12. In the loading position, a substantially larger space is established between the rail 22' and the base 12' to facilitate loading of the sheet layer(s) 13. Once the sheet layer(s) 13 are loaded, the rail 22' can be pivoted down to the operative position in FIG. 12, wherein the rail 22' captively holds the sheet layer(s) 13 against the base 12' for a cutting operation.

Figure 13:
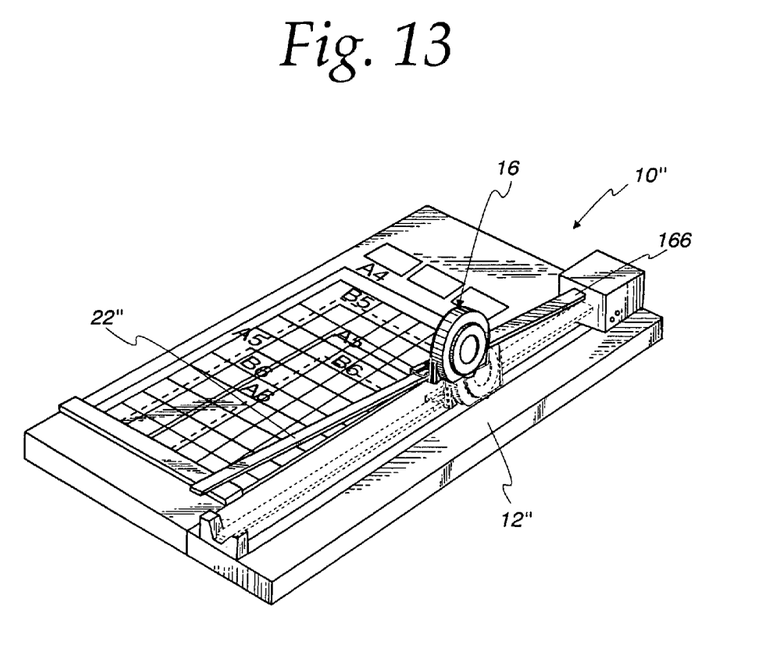
FIG. 13 is a view as in FIGS. 11 and 12 of a further modified form of sheet layer cutting system, according to the present invention.

In FIG. 13, a further modified form of cutting system is shown at 10" and has a base 12" and a rail 22" attached thereto. The system 10" differs from the system 10' in that the rail 22' is pivoted at one end 166 to facilitate loading of the sheet layer(s) 13. Once the sheet layer(s) 13 is loaded upon the base 12", the rail 22", with the attached cutting blade assembly 16, can be pivoted downwardly, as shown in dotted lines, to an operative position wherein the sheet layer(s) 13 is captive between the rail 22" and the base 12". The cutting blade assembly 16 can be operated in the same manner as previously described. The system 10" shown in FIG. 13 is the subject of U.S. Pat. No. 5,069,097, which is incorporated herein by reference.

The alternative systems described above are exemplary in nature only. As previously mentioned, the inventive concept can be incorporated into virtually any type of cutting system utilizing a movable cutting blade assembly, including, for example, one as shown in U.S. Pat. No. 5,287,783, which discloses a rail that is obliquely translated. This patent is likewise incorporated herein by reference.

The foregoing disclosure of specific embodiments is intended to be illustrative of the broad concepts comprehended by the invention.

The invention claimed is:

1. In combination:
    a base upon which at least one sheet layer can be operatively supported to be cut;
    a guide assembly; and
    a cutting blade assembly comprising first and second cutting blades and a housing defining a receptacle,
    the cutting blade assembly selectively changeable between a) a first state wherein the first cutting blade is in a first operative position and the second cutting blade is in a first inactive position and b) a second state wherein the second cutting blade is in a second operative position and the first cutting blade is in a second inactive position,
    the cutting blade assembly cooperating with the guide assembly to be movable guidingly in a cutting path, the first cutting blade in the first operative position causing cutting of a sheet layer operatively supported on the base as the cutting blade assembly is moved in the cutting path, the second cutting blade in the second operative position causing cutting of a sheet layer operatively supported on the base as the cutting blade assembly is moved in the cutting path, wherein the first and second cutting blades are mounted on a blade carrier that is movable guidingly relative to the housing within the receptacle to simultaneously change the first and second cutting blades between their operative and inactive positions, wherein the blade carrier is guidingly movable around an axis to change the first and second cutting blades between their operative and inactive positions, wherein the base has a flat surface on which the at least one sheet layer can be operatively supported, the flat support surface resides in a first plane, and the axis is substantially parallel to the first plane, wherein the receptacle has a first effective diameter as viewed along the axis, wherein there is an axially extending knob that is connected to the blade carrier and projects from the housing and can be grasped and pivoted around the axis to move the blade carrier and thereby change the cutting blade assembly between the first and second states, the knob having an effective diameter as viewed along the axis that is substantially less than the first effective diameter, the cutting blade assembly further comprising a maintaining structure cooperating between the housing and blade carrier that releasably maintains the cutting blade assembly in two different predetermined positions relative to the housing corresponding to the first and second states for the cutting blade assembly.

2. The combination according to claim 1 wherein the first cutting blade moves from the first operative position into the second inactive position as an incident of the second cutting blade moving from the first inactive position into the second operative position.

3. The combination according to claim 1 wherein the cutting blade assembly comprises a third cutting blade.

4. The combination according to claim 1 wherein the blade carrier has a body with first and second oppositely facing flat sides and first and second posts projecting from the first flat side and journalled for rotation respectively in the first and second cutting blades.

5. The combination according to claim 4 wherein the first post projects in a first line, the second post projects in a second line and the first and second lines are substantially parallel to the axis.

6. The combination according to claim 1 wherein the first and second blades have the same configuration.

7. The combination according to claim 1 wherein the first and second cutting blades have a different configuration to produce different types of cuts in a sheet layer and there are indicia on the housing that are alignable with the knob to identify the state of the cutting blade assembly.

8. The combination according to claim 1 wherein the guide assembly comprises an elongate rail.

9. The combination according to claim 8 wherein the elongate rail is repositionable relative to the base.

10. The combination according to claim 9 wherein the elongate rail is repositionable by translation relative to the base.

11. The combination according to claim 9 wherein the elongate rail is repositionable by guided pivoting movement relative to the base.

12. The combination according to claim 1 wherein the cutting blade assembly has indicia to identify which of the first and second cutting blades is in its operative position.

\* \* \* \* \*